(12) United States Patent
Sanatgar et al.

(10) Patent No.: US 7,905,454 B2
(45) Date of Patent: Mar. 15, 2011

(54) METAL TUBE SUPPORT BRACKET

(75) Inventors: Homayoun Sanatgar, Alta Loma, CA (US); Behnam Akbarian, Corona, CA (US); Gary Johnson, Santa Clarita, CA (US); Neil Holt, Crestline, CA (US); Don Smith, Highland, CA (US)

(73) Assignee: Thermal Dynamics Corporation, Ontario, CA (US)

( * ) Notice: Subject to any disclaimer, the term of this patent is extended or adjusted under 35 U.S.C. 154(b) by 338 days.

(21) Appl. No.: 10/601,110

(22) Filed: Jun. 23, 2003

(65) Prior Publication Data

US 2004/0256528 A1    Dec. 23, 2004

(51) Int. Cl.
*F16L 5/00*      (2006.01)

(52) U.S. Cl. ............. 248/56; 248/65; 248/300; 285/257

(58) Field of Classification Search .................. 248/300, 248/56, 65, 72, 73; 285/257
See application file for complete search history.

(56) References Cited

U.S. PATENT DOCUMENTS

| | | | | |
|---|---|---|---|---|
| 714,243 A * | 11/1902 | Sargent, Jr. | | 285/257 |
| 1,127,844 A * | 2/1915 | Anderson | | 52/219 |
| 2,140,443 A * | 12/1938 | Clark | | 248/27.3 |
| 3,193,613 A * | 7/1965 | Van Buren, Jr. | | 174/65 G |
| 3,690,609 A * | 9/1972 | Montesdioca | | 248/68.1 |
| 3,809,350 A * | 5/1974 | Lane | | 248/57 |
| 4,254,930 A * | 3/1981 | Warren | | 248/542 |
| 4,299,363 A * | 11/1981 | Datschefski | | 248/56 |
| 4,550,451 A * | 11/1985 | Hubbard | | 4/695 |
| 5,370,345 A * | 12/1994 | Condon | | 248/65 |
| 5,693,910 A * | 12/1997 | Gretz | | 174/65 G |
| 5,839,848 A * | 11/1998 | Sahramaa | | 403/382 |
| 5,909,904 A * | 6/1999 | Shea | | 285/405 |
| 6,158,066 A * | 12/2000 | Brown et al. | | 4/695 |
| 6,375,128 B1 * | 4/2002 | Condon et al. | | 248/57 |
| 6,702,236 B1 * | 3/2004 | Kirschner | | 248/65 |

* cited by examiner

*Primary Examiner* — Anita M King
(74) *Attorney, Agent, or Firm* — Dickstein Shapiro LLP

(57) ABSTRACT

A tube support bracket that comprises an aluminum-coated steel support bracket formed having a circular tube-receiving aperture and an annular, castellated collar abutting the aperture. The aperture and collar are sized for receiving therethrough in close-fitting relationship an aluminum alloy heat exchanger tube. The collar, formed by a draw-punching process, has a plurality of spaced-apart, axial tabs sized for swaging against in hoop stress and bite the received tube. An inner surface of each of the collar tabs being has at least one axial groove therein, the groove being configured for receiving exterior regions of the received tube when the collar is swaged tightly against the tube to thereby lock the tube in the collar and thus in the support bracket. A corresponding method for making a tube support is disclosed.

23 Claims, 2 Drawing Sheets

METAL TUBE SUPPORT BRACKET

BACKGROUND OF THE INVENTION

1. Field of the Invention

The present invention relates generally to the field of metal tubes and support brackets therefor, and more particularly to brackets for supporting metal heat exchanger tubes.

2. Background Description

So far as is known to the present inventor, the usual practice for supporting metal tubes, such as are used for and in heat exchangers, is to provide a support bracket that is constructed, and then welding or brazing the tube to the support bracket.

A problem associated with such tube support systems is that the welding or brazing process is relatively time consuming and hence costly. Moreover, substantial skill is required for good welding or brazing of the tube to the support bracket; improper welding or brazing may, for example cause burning through the metal tube being supported, thereby causing fluid leakage from the supported tube. Furthermore, improper welding or brazing may cause the supported tube to work loose from the support bracket.

For these and other reasons, the present inventor has invented a metal tube support bracket in which the tube to be supported thereby is passed through an aperture in the bracket and is then securely swaged into the bracket. The result is that the mounting of the tube to the support bracket is fast and simple and does not require great skill, thereby providing an effective, yet comparatively low cost assembly. Moreover such assembly does not require that the support bracket and tube be constructed from the same metal material.

SUMMARY OF THE INVENTION

A tube support bracket comprises a metal support bracket formed having a circular tube-receiving aperture and an annular, castellated collar abutting the aperture, the aperture and collar being sized for receiving there-through in close-fitting relationship a metal tube, such as an aluminum alloy heat exchanger tube. The collar is formed having a plurality of, preferably four, spaced-apart, axial tabs sized for swaging against in hoop stress and bite against the received tube. Moreover, the collar is formed integrally as a part of the support bracket.

An inner surface of each of the collar tabs is formed having at least one axial groove formed therein, the groove being configured for receiving exterior regions of the received tube when the collar is swaged tightly against the tube to thereby lock the tube in the collar and thus in the support bracket.

The support bracket and collar are formed from a ductile metal alloy that preferably comprises an aluminum-coated steel material. Also preferably, the collar is formed by draw-punching a region of the support bracket.

More particularly, a tube support bracket comprises a metal support bracket formed having a circular tube-receiving aperture and an annular, castellated collar abutting the aperture, the aperture and collar being sized for receiving therethrough in close-fitting relationship an aluminum alloy heat exchanger tube. The collar is formed having a plurality of spaced-apart, axial tabs sized for swaging against in hoop stress and bite the received tube, an inner surface of each of the collar tabs being formed having at least one axial groove therein, the groove being configured for receiving exterior regions of the received tube when the collar is swaged tightly against the tube to thereby lock the tube in the collar and thus in the support bracket.

The collar is formed integrally as a part of the support bracket, and the support bracket and collar are formed from an aluminum-coated ductile steel alloy, the collar being formed by draw-punching a region of the support bracket and the plurality of axial tabs preferably comprise four, equally spaced-apart tabs.

A method for supporting a metal tube comprises the steps of providing a ductile metal bracket, draw-punching a region of the support bracket to form an aperture having a contiguous castellated collar with a plurality of spaced-apart axial tabs, the aperture and collar being sized for receiving in close-fitting relationship a metal tube. Included are the steps of installing a metal tube through the aperture and collar and swaging the collar against the installed tube with sufficient radial force to cause the axial tabs to hoop stress and bite against the installed tube.

Preferably included is the step of forming at least one axial groove into an inner surface of each of the tabs, the swaging step then swaging the collar against the installed tube with sufficient force to cause outside regions of the installed tube to be extruded into the axial grooves. The step of providing a ductile metal bracket preferably includes forming the bracket from an aluminum-coated steel alloy.

Preferably the step of draw-punching a region of the support bracket includes the preliminary steps of making a hole in the region and them enlarging the hole to form a plurality of spaced-apart radial tabs. The step of forming a plurality of radial tabs preferably includes forming four equally spaced-apart radial tabs, which are subsequently formed into four equally spaced-apart axial tabs of said collar.

More particularly, a method for supporting a metal tube comprises the steps of providing a ductile, aluminum-coated steel alloy bracket, draw-punching a region of the bracket to form an aperture having a contiguous castellated collar with four equally spaced-apart axial tabs, the aperture and collar being sized for receiving in close-fitting relationship a metal tube.

The method includes the steps of forming at least one axial groove into an inner surface of each of the tabs, installing an aluminum alloy heat exchanger tube through the aperture and collar, and swaging the collar against the installed tube with sufficient radial force to cause the axial tabs to hoop stress and bite the installed tube and to cause outer regions of the installed tube to extrude into the axial grooves.

It is preferred that the step of draw-punching a region of the support bracket includes the preliminary steps of making a hole in the region and them enlarging the hole to form four equally spaced-apart radial tabs which are subsequently formed into four equally spaced-apart axial tabs of the collar by the draw-punching step.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the accompanying drawings in which:

FIG. 7A showing an initial hole formed in the bracket prior to draw-forming of the collar, and FIG. 7B showing the hole of FIG. 7A enlarged to form 4 equally spaced-apart radial tabs that subsequently become the four axial tabs of the collar.

In the various FIGS. identical elements and features are given the same reference numbers.

DESCRIPTION OF A PREFERRED EMBODIMENT

Figure 1:
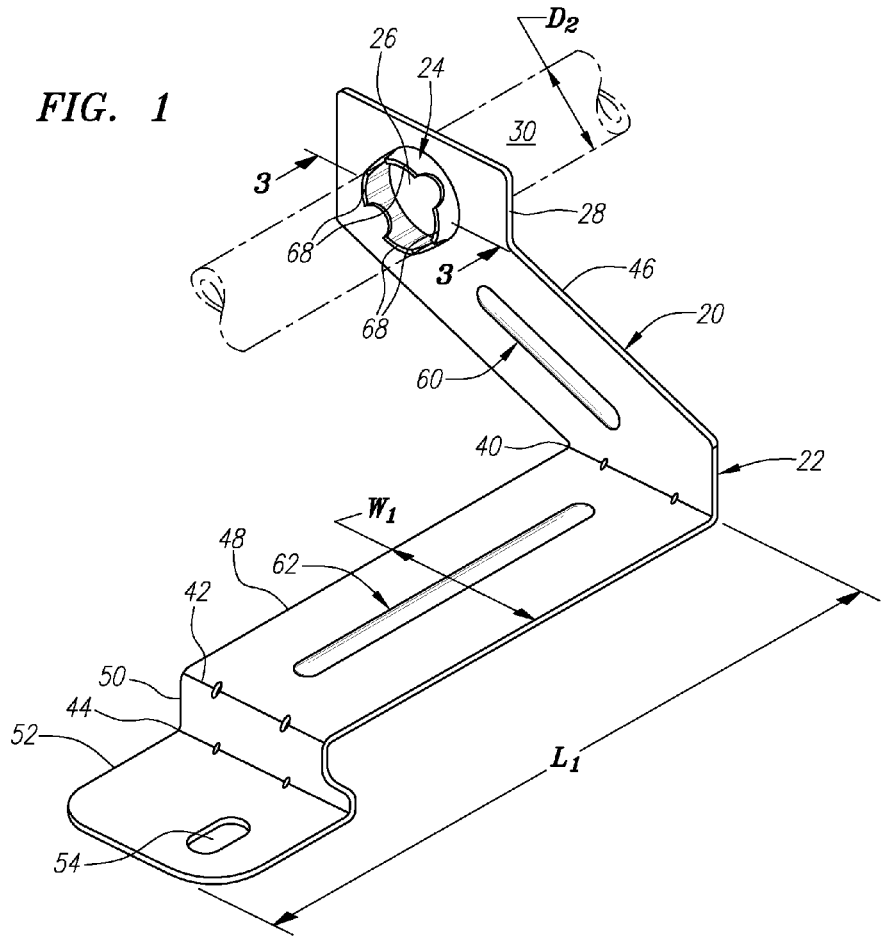
FIG. 1 is a perspective drawing of the tube support bracket of the present invention, showing a castellated collar formed in a region of the bracket and showing, in phantom lines, a tube installed through the collar.

There is depicted in the perspective drawing of FIG. 1 a tube support bracket 20 that comprises a bracket 22 having an axial, castellated collar 24 formed around a circular aperture 26 at a bracket first end region 28. Shown, in phantom lines is a tube 30 installed axially through aperture 26 and collar 24.

Bracket 22 is shown having three right angle bends 40, 42 and 44 that effectively divide the bracket into four sections: a first section 46 (that includes first end region 28), a second section 48, a third section 50 and a fourth section 52. A bracket mounting aperture 54 is formed in fourth section 52 for mounting bracket 22 to a structure (not shown). First and second elongate stiffening beads or ribs 60 and 62, respectively, are formed along central regions of respective bracket sections 46 and 48.

Figure 2:
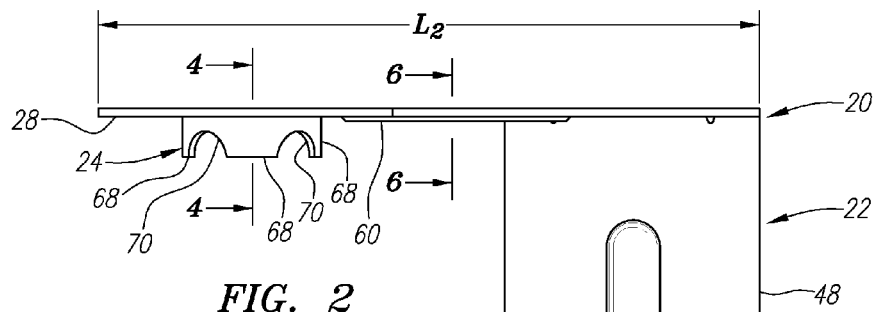
FIG. 2 is top plan view of the collar region of the support bracket, showing features of the collar.

Together, second and fourth bracket sections 48 and 52 have an overall length, L, (FIG. 1) that may be about 5 inches. First bracket section 46 has an overall length, $L_2$, (FIG. 2) that may be about 3.25 inches. Bracket 22 has a generally uniform width, $W_1$, (FIG. 1) that may be about 1.25 inches, except that fourth section 52 may be a little wider.

Figure 3:
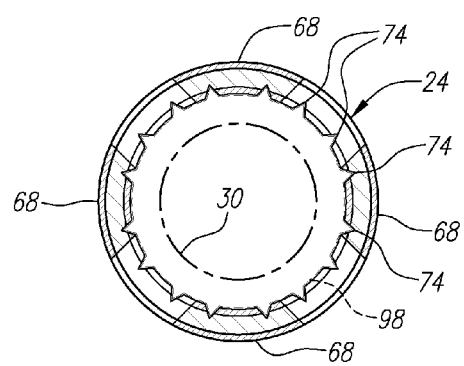
FIG. 3 is a transverse cross sectional drawing, taken along line 3-3 of FIG. 1, showing internal features of the collar and showing the four axial tabs of the collar swaged tightly against the installed tube, and showing outer surface regions of the installed tube extruded into axial grooves formed into an inner surface of the collar.
Figure 4:
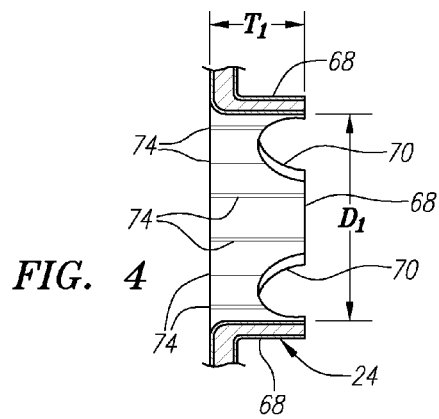
FIG. 4 is an axial cross sectional drawing, taken along line 4-4 of FIG. 2, showing inner surface grooves formed in the collar.

Collar 24 is formed as part of bracket 22 by a draw-punching operation, as more particularly described below. As particularly shown in FIG. 3, and also as seen in FIG. 1, collar 24 is formed having four equally spaced-apart axial tabs or ears 68. Each tab 68 may extend for about 45 degrees and the separation between each adjacent pair of tabs may likewise be about 45 degrees. As shown in FIG. 4, collar 24 has an inner diameter, $D_1$, that is selected according to an outside diameter, $D_2$, (FIG. 1) of tube 30 to provide a close fit between the tube and collar when the tube is installed through the collar.

Figure 5:
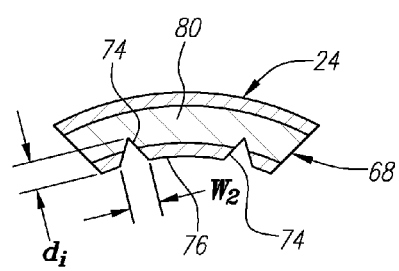
FIG. 5 is an enlarged drawing of a representative one of the four tabs of the collar, showing details of the axial grooves formed into the inner surface of the tab.

As shown in FIG. 4, collar 24 has an axial thickness, $T_1$, that may be about 0.25-0.38 inch. Also as shown, each axial tab 68 is spaced from the next adjacent tab by an intermediate arcuate recess or cutout 70. Collar 24 is formed having at least one, and preferably two as shown in FIGS. 3-5, relatively small, shallow axial grooves 74 formed into an inner collar surface 76 (FIG. 5), the grooves 74 extending the entire length of each of tabs 68. Preferably, intermediate regions 70 are likewise provided by a pair of axial grooves 74. Preferably all of axial grooves 74 are equally spaced-apart around the inside of collar 24. As shown in FIG. 5 for a representative tab 68, each groove 74 has a width, $W_2$, that may be only about 0.03-0.05 inch, and a depth, $d_t$, that may be only about 0.03-0.05 inch.

Figure 6:
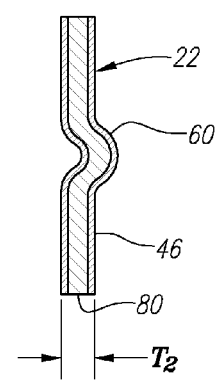
FIG. 6 is a cross sectional drawing taken along line 6-6 of FIG. 2, showing the bracket formed from an aluminum-coated steel material.

As shown in FIG. 6, bracket 22 has an overall thickness, $T_2$, that may be about 0.060 inch. As shown greatly exaggerated, bracket 22 is preferably constructed having a malleable metal core 80, made of a material such as a steel alloy, that is clad with a thin layer of aluminum to provide corrosion resistance and facilitate draw-punching or draw-forming of collar 24 without cracking.

Figure 7A:
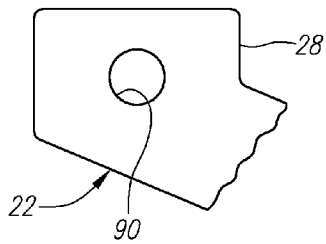
FIGS. 7A and 7B are two side views of the collar region of the bracket.
Figure 7B:
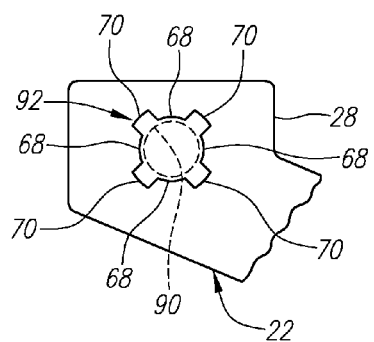

FIGS. 7A and 7B depict two preliminary steps in the draw-punching of collar 24. In an initial step depicted in FIG. 7A, a circular center hole 90 is punched or drilled in bracket end region 28 in the desired location of collar 24. Next, as depicted in FIG. 7B, a shaped hole 92 is punched or cut into bracket end region around central aperture 90 in a manner forming four tabs 68 in a radial direction. Finally, hole 92 is draw-punched in a known manner used in industry to form tubular products, thereby forming collar 24.

After collar 24 is formed with four tabs 68 and all axial grooves 74, tube 30 is installed through aperture 26 and collar 24. Then collar 24 is radially swaged tightly against tube 30 with a radial force sufficient to generate a hoop stress and bite the installed tube and cause an exterior surface 98 of the tube to flow or extrude into grooves 74, thereby locking the tube in the collar and hence into bracket 22.

It will be appreciated that a corresponding method for supporting tube 30 in bracket 22 is provided, the method comprising the steps of providing a ductile, aluminum-coated steel alloy bracket 22, draw-punching a region of the support bracket to form an aperture 26 having a contiguous castellated collar 24 with four equally spaced-apart axial tabs 68, the aperture and collar being sized for receiving in close-fitting relationship metal tube 30. Included are the steps of forming at least one axial groove 74 into inner surface 76 of each of tabs 68, installing an aluminum alloy tube 30 through aperture 26 and collar 24, and swaging the collar against the installed tube with sufficient radial force to cause the tabs 68 to generate a hoop stress and bite the installed tube and to cause regions of the installed tube to extrude into the axial grooves. Further included are the preliminary steps of making hole 90 in the region for collar 24 and then enlarging the hole to form four equally spaced-apart radial tabs 68 which are subsequently formed into four equally spaced-apart axial tabs of the collar by the draw-punching step.

Thus, there has been described above a support bracket for a metal tube, particularly, a metal heat exchanger tube and a corresponding method for supporting a tube, for purposes of illustrating the manner in which the present invention may be used to advantage. It will, however, be appreciated that the invention is not limited thereto but includes any and all variations and modifications which may occur to those skilled in the art without violating the scope and spirit of the claims as appended hereto.

What is claimed is:

1. A tube support bracket that comprises a circular tube-receiving aperture and an annular, castellated collar abutting said aperture, said aperture and collar being sized for receiving therethrough in close-fitting relationship a metal tube, said collar being formed having a plurality of spaced-apart, axial tabs sized for swaging against said received metal tube to generate a hoop stress and bite said received metal tube, wherein an inner surface of each of said collar tabs is formed having at least one axial groove formed therein, said groove being configured for receiving exterior regions of said received tube when the collar is swaged tightly against the tube to thereby lock the tube in the collar and thus in the support bracket.

2. The tube support bracket as claimed in claim 1, wherein said collar is formed integrally as a part of said support bracket.

3. The tube support bracket as claimed in claim 1, wherein said support bracket and collar are formed from a ductile metal alloy.

4. The tube support bracket as claimed in claim 3, wherein said ductile metal alloy comprises an aluminum-coated steel material.

5. The tube support bracket as claimed in claim 1, wherein said plurality of axial tabs comprise four, equally spaced-apart tabs.

6. A tube support bracket that comprises a circular tube-receiving aperture and an annular, castellated collar abutting said aperture, said aperture and collar being sized for receiving therethrough in close-fitting relationship a metal tube, said collar being formed having a plurality of spaced-apart, axial tabs sized for swaging against said received metal tube to generate a hoop stress and bite said received metal tube, wherein said collar is formed in a draw-punched region of said support bracket.

7. A tube support bracket that comprises a circular tube-receiving aperture and an annular, castellated collar abutting said aperture, said aperture and collar being sized for receiving therethrough in close-fitting relationship an aluminum alloy heat exchanger tube, said collar being formed having a plurality of spaced-apart, axial tabs sized for swaging against said aluminum alloy heat exchanger tube to generate a hoop stress against said tube and to bite into said tube, an inner surface of each of said collar tabs being formed having at least one axial groove therein, said groove being configured for receiving exterior regions of said received tube when the collar is swaged tightly against the tube to thereby lock the tube in the collar and thus in the support bracket.

8. The tube support bracket as claimed in claim 7, wherein said collar is formed integrally as a part of said support bracket, and wherein said support bracket and collar are formed from an aluminum-coated, ductile steel alloy.

9. The tube support bracket as claimed in claim 7, wherein said collar is formed in a draw-punched region of said support bracket and wherein said plurality of axial tabs comprise four, equally spaced-apart tabs.

10. A combination, said combination comprising:
a metal tube; and
a metal tube support bracket having a circular tube-receiving aperture, and an annular, castellated collar abutting said aperture, said metal tube received within said circular tube-receiving aperture and said collar being swaged against said metal tube and biting into said metal tube, wherein said collar is formed from a plurality of spaced-apart, axial tabs, the inner surface of each of said tabs having at least one axial groove formed therein, and wherein the swaging of said collar presses said axial tabs against said metal tube to produce a hoop stress against said metal tube and causes said axial tabs to bite into said metal tube thereby locking the tube to the bracket.

11. The combination as claimed in claim 10, wherein said collar is formed integrally as a part of said support bracket.

12. The combination as claimed in claim 10, wherein said collar is formed from a ductile metal alloy.

13. The combination as claimed in claim 12, wherein said ductile metal alloy comprises an aluminum-coated steel material.

14. The combination as claimed in claim 10, wherein said plurality of axial tabs comprise four, equally spaced-apart tabs.

15. The combination as claimed in claim 10, wherein said collar is formed in a draw-punched region of said support bracket.

16. The combination as claimed in claim 10, wherein said received metal tube is constructed from an aluminum alloy.

17. A structure of a metal tube and a metal tube support bracket, said structure comprising:
a metal tube; and
a metal tube support bracket having a circular tube-receiving aperture, and an annular, castellated collar abutting said aperture, said metal tube received within said circular tube-receiving aperture and said collar being swaged against said metal tube and biting into said metal tube, wherein said collar is formed from a plurality of spaced-apart, axial tabs, and wherein the swaging of said collar presses said axial tabs against said metal tube to produce a hoop stress against said metal tube and causes said axial tabs to bite into said metal tube thereby locking the tube to the bracket.

18. The structure as claimed in claim 17, wherein an inner surface of each of said axial tabs is formed having at least one axial groove formed therein, said groove being configured for receiving exterior regions of said received tube when the collar is swaged tightly against the metal tube.

19. The structure as claimed in claim 17, wherein said collar is formed integrally as a part of said support bracket.

20. The structure as claimed in claim 17, wherein said collar is formed from a ductile metal alloy.

21. The structure as claimed in claim 20, wherein said ductile metal alloy comprises an aluminum-coated steel material.

22. The structure as claimed in claim 17, wherein said collar is formed in a draw-punched region of said support bracket.

23. The structure as claimed in claim 17, wherein said received metal tube is constructed from an aluminum alloy.

* * * * *